United States Patent [19]
Deutch et al.

[11] Patent Number: 5,815,870
[45] Date of Patent: Oct. 6, 1998

[54] REVERSIBLE RAMP AND METHOD FOR FABRICATING SAME

[75] Inventors: Keith Deutch, Shawnee, Kans.; Rick Lavelock, Pleasant Hill; Clayton Smith, Blue Springs, both of Mo.

[73] Assignee: ROM Corporation, Kansas City, Mo.

[21] Appl. No.: 772,700

[22] Filed: Dec. 23, 1996

(Under 37 CFR 1.47)

[51] Int. Cl.⁶ .................................................. E01D 1/00
[52] U.S. Cl. .............................. 14/69.5; 52/180; 52/181; 414/537
[58] Field of Search ..................................... 14/69.5, 71.1, 14/72.5, 73; 404/19, 20, 21; 182/48, 230; 52/180, 181; 414/537; 238/14; 296/61

[56] References Cited

U.S. PATENT DOCUMENTS

| | | | |
|---|---|---|---|
| 963,889 | 7/1910 | Goodwin | 52/181 |
| 2,779,958 | 2/1957 | Hodges et al. | |
| 3,057,271 | 10/1962 | Butler et al. | 52/181 |
| 3,328,818 | 7/1967 | Melcher | |
| 3,517,791 | 6/1970 | Miles | 414/537 X |
| 3,984,891 | 10/1976 | Weinmann | |
| 3,999,397 | 12/1976 | Albery | |
| 4,624,619 | 11/1986 | Uher | 14/71.1 X |
| 5,325,558 | 7/1994 | Labreche | |
| 5,347,672 | 9/1994 | Everard et al. | |
| 5,540,474 | 7/1996 | Holland | 414/537 X |

*Primary Examiner*—Tamara L. Graysay
*Assistant Examiner*—Sunil Singh
*Attorney, Agent, or Firm*—Shook, Hardy & Bacon, L.L.P.

[57] ABSTRACT

A ramp, and a process for fabricating the ramp, wherein the ramp is reversible. First and second elongate side members which can be formed of an extruded magnesium alloy. A plurality of grates, each grate formed of die-cast aluminum, are positioned between the first and second side members to provide a load bearing platform. Tie rods are connected between the elongate side members by self-tapping screws, such that adjacent grates are separated and supported by an intermediate tie rod. Each grate has gripping nodules on upper and lower side surface thereof. One end of the ramp has a removable apron which is angularly oriented relative to the platform of the ramp for engaging with a generally flat surface, such as a dock or truck bed. The apron may be removed, the ramp turned over, and the apron re-positioned on the body of the ramp, thereby causing the upper and lower surfaces of the ramp to trade places. In this way, when the gripping nodules on a first load bearing surface of the ramp become worn, the ramp may be reversed, thereby increasing the wear life of the ramp.

20 Claims, 6 Drawing Sheets

REVERSIBLE RAMP AND METHOD FOR FABRICATING SAME

BACKGROUND OF THE INVENTION

1. Field of the Invention

The present invention is directed to a ramp. More particularly, the present invention is directed to a metallic ramp, for providing a spanning surface between two other surfaces (e.g., truck-to-ground; dock-to-ground), and a method for fabricating the ramp.

2. Description of the Related Art

Various types of ramps have been developed for providing a surface for extending between two other surfaces. U.S. Pat. No. 2,779,958 (Hodges et al.) discloses a ramp for bridging a gap between a transporting means and a loading dock. The ramp is equipped with a pivoting shoe at each end to allow the ramp to be used between surfaces of different heights. U.S. Pat. No. 3,328,818 (Melcher) discloses a reinforced walking ramp of the type utilized in loading and unloading trucks. The Melcher ramp is formed of a single piece of molded material.

U.S. Pat. No. 3,984,891 (Weinmann) discloses a portable ramp with pivoting shoes at each end. U.S. Pat. No. 3,999,397 (Albery) discloses a modular dock system. A flat upper surface of the dock system has a non-skid surfacing material. U.S. Pat. No. 5,325,558 (Labreche) is directed to a wheelchair ramp. In the Labreche ramp, elongate outer tracks receive mesh floor panels. U.S. Pat. No. 5,347,672 (Everard et al.) discloses a portable, collapsible ramp utilizing aluminum alloy.

It is known to make ramps out of a variety of materials. For instance, fiberglass ramps are currently available. Other ramps are formed of extruded parts having a plurality of rods extending between outer support pieces. Still other ramps are formed of aluminum or metal sheets having holes punched therein, where the rim of each hole is pressed upwardly for traction and gripping purposes. Still other ramps are formed of stamped aluminum plates positioned between extruded aluminum support members.

A significant problem with conventional ramps, such as those previously described, is that the primary surface of the ramp becomes worn after extended use, thereby requiring the ramp to be replaced. A ramp having a worn walking surface is particularly hazardous considering the fact that ramps are often utilized on an incline and in conjunction with loading or unloading heavy materials. This problem is often intensified because, although a worn walking surface of a ramp creates a highly hazardous working condition, it is not uncommon for a ramp to be used longer than desired because of the expense and hassle associated with replacing the worn ramp with a new one.

Additionally, many conventional ramps are typically fabricated by extruding aluminum into the components for the ramp or, alternatively, by extruding portions of the ramp, such as elongate side members, while stamping grates or steps to be positioned between the side members. While conventional fabrication processes result in sturdy, reliable ramps, such fabrication techniques have drawbacks in that they do not allow a ramp to be conveniently and inexpensively formed having gripping nodules, for traction, on both a top and bottom surface of the ramp. A ramp having such gripping nodules on both sides thereof would be highly desirable, if the ramp were further constructed to be easily reversible.

Accordingly, the need exists for a ramp which is reversible so that the wear life of the ramp is extended. Additionally, the need exists for a ramp, and a method for fabricating a ramp, wherein the ramp has gripping nodules on each surface of the ramp, thus permitting it to be reversible. The present invention fills these and other needs, and overcomes the drawbacks and shortfalls of the prior art ramps.

SUMMARY OF THE INVENTION

It is an object of the present invention to provide an inexpensive ramp and a method for fabricating an inexpensive ramp.

It is a primary object of the present invention to provide a reversible ramp.

It is a further object of the present invention to provide a unique method for manufacturing a ramp, which method utilizes both extrusion and die-casting processes.

It is an object of the present invention to provide an reversible ramp having gripping nodules on opposite sides of a load bearing platform thereof.

These and other objects are achieved by a ramp having elongate side members, serving as support beams, which can be formed of an extruded aluminum alloy. A series of grates, formed by a magnesium die-casting process, forms a platform between the support beams. The die-casting process for forming the grates creates gripping nodules on upper and lower surfaces of the grates, thus permitting the ramp to be reversible.

Specifically, each elongate support beam has a channel along one side thereof for receiving and retaining an outer end of each grate. Tie rods are positioned between each grate and extend laterally across the ramp between the support beams. The tie rods have a general I-beam construction, and engagingly receive portions of each grate so that the grate is gripped within a portion of the tie rod. Self-tapping screws are screwed through the elongate support beams and into the ends of the tie rods to fixedly attach the tie rods to the support beams and, thus, to further secure the grates between the support beams. The utilization of tie rods in accordance with the principles of the present invention is extremely useful. The tie rods distribute a load applied to any given grate to both the tie rod itself, as well as the adjacent grate. Additionally, the tie rods draw the elongate support beams inwardly towards the grates when the self-tapping screws are screwed into the ends of the tie rods. This sandwiches the entire ramp together, thereby creating an extremely strong and dynamic ramp.

At one end of the ramp is an apron for engaging with the bed surface of a truck or a dock. The other end of the ramp has a transition plate for engaging with the ground. A portion of the apron is positioned angularly relative to the platform formed by the grates, so that the apron may mate with the generally horizontal surface of a truck bed or dock. The apron is releasibly mounted at the first end of the ramp, so that it may be removed. The ramp is then flipped over so that its upper surface becomes its lower surface, and vice versa, and the apron is reattached at the first end of the ramp. In this way, when the upper surface of the ramp becomes worn, the ramp may be easily reversed, thereby providing an unused surface having gripping nodules thereon. As a result, the ramp of the present invention has an extended wear life and provides increased safety for its users.

BRIEF DESCRIPTION OF THE DRAWINGS

The objects and features of the invention noted above are explained in more detail with reference to the drawings, in which like reference numerals denote like elements, and in which.

DETAILED DESCRIPTION OF THE INVENTION

Figures 1, 8:
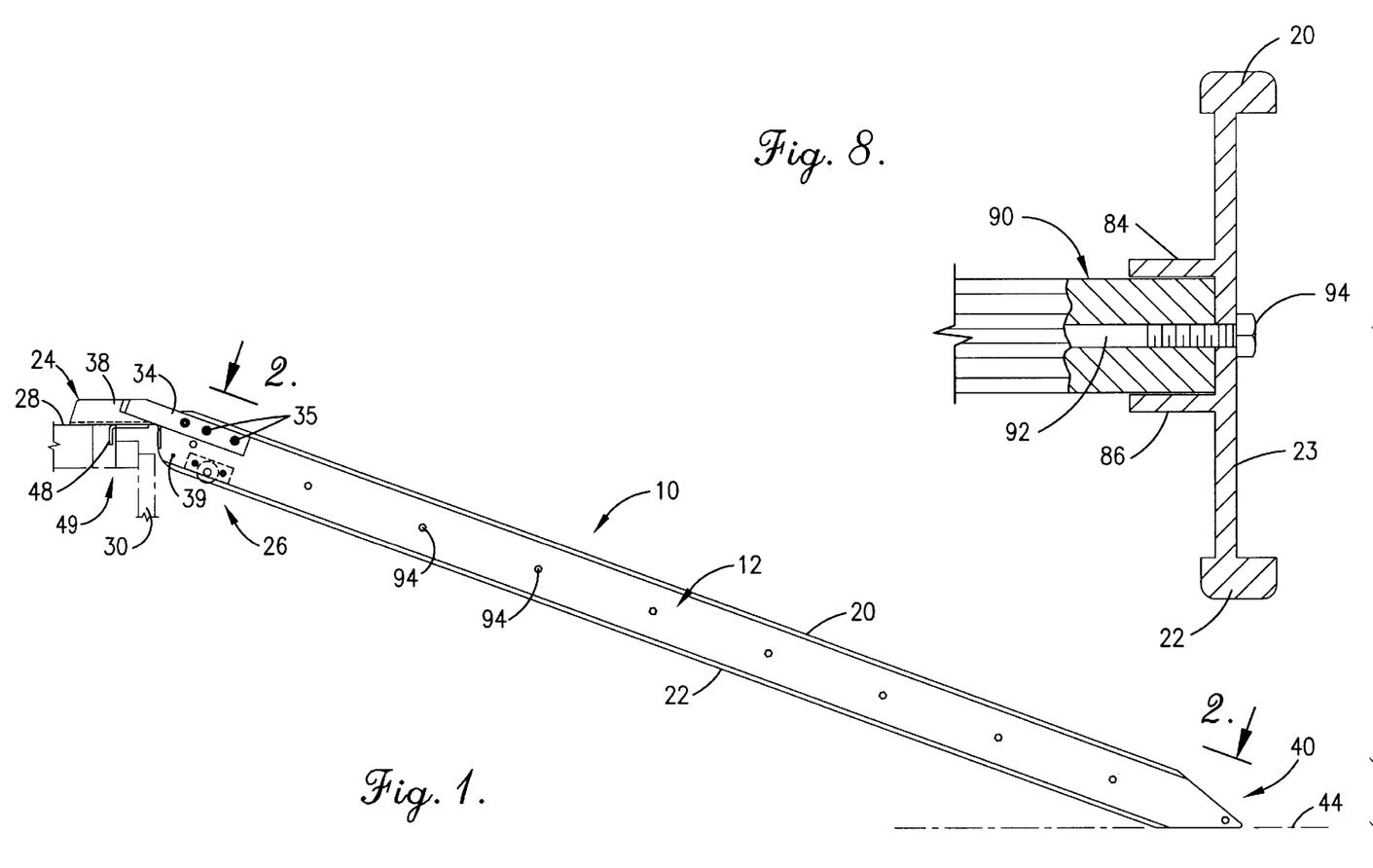
FIG. 1 is a side elevational view of the ramp of the present invention.
FIG. 8 is a fragmentary cross-sectional end view taken along line 8—8 of FIG. 4.
Figure 2:
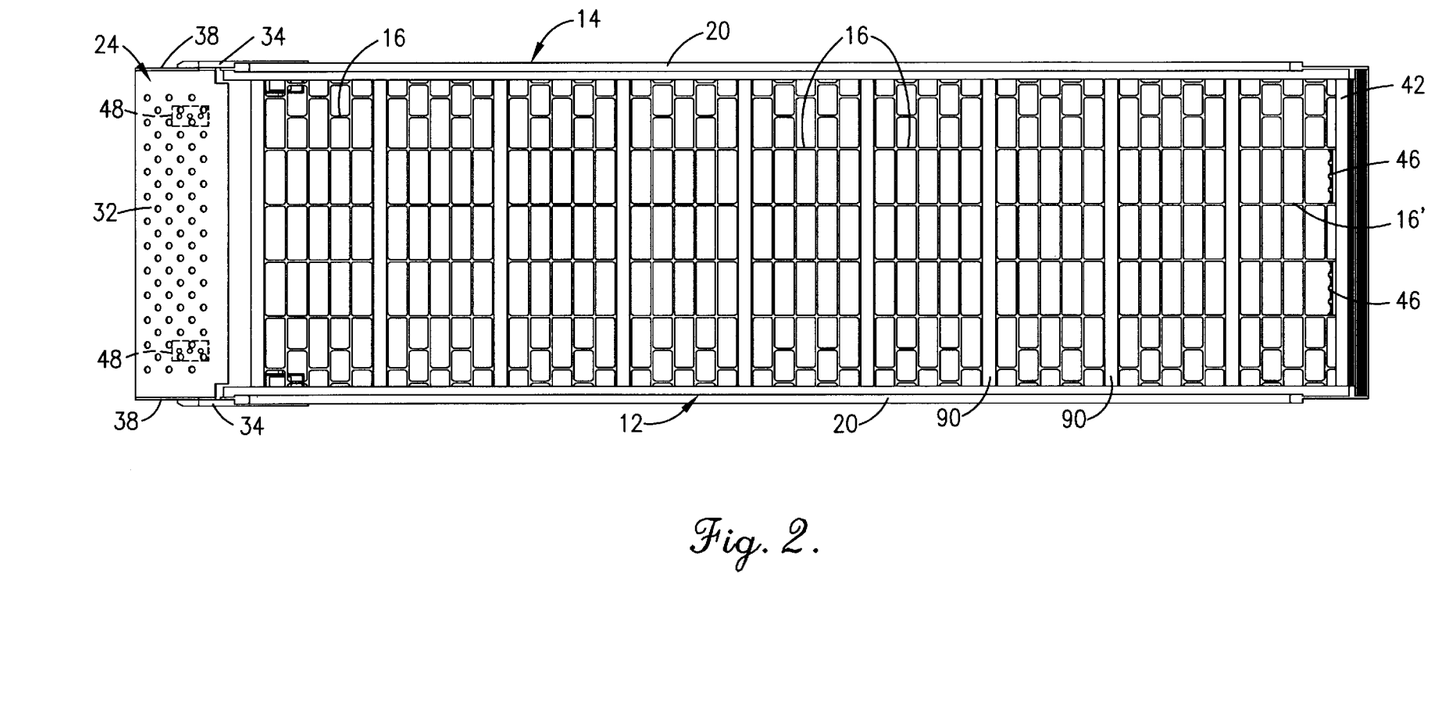
FIG. 2 is a top plan view, as taken along line 2—2 of FIG. 1, of the ramp of the present invention.

With reference initially to FIGS. 1 and 2, a ramp of the present invention is denoted generally by reference numeral 10. Ramp 10 has a body portion comprised of first and second elongate side members 12, 14, respectively and a plurality of grates 16 mounted between elongate side members 12, 14. Elongate side members 12, 14 are preferably in the form of an I-beam (see FIG. 8), thereby having upper and lower portions 20, 22, respectively, oriented perpendicularly to a primary member 23. However, grates 16 are preferably fixedly mounted between elongate side members 12, 14 in a manner which utilizes tie rods, as discussed in detail below.

An apron 24, preferably formed of an aluminum alloy and having a plurality of apertures therein, is mounted at a first end 26 of ramp 10. Apron 24 is adapted to engage with a generally horizontal surface 28, such as the bed of a truck or a loading dock. The structure generally denoted by reference numeral 30 is illustrative, for instance, of a bumper as commonly found on trucks and docks. Apron 24 is comprised of a generally flat plate having an upper surface 32 and a lower surface 33 (see FIG. 4). The apron 24 has wall portions 38 extending upwardly from each side edge of upper surface 32. A pair of mounting bracket members, each denoted generally by reference numeral 34, are fastened by bolts 35 to the first end 26 of ramp 10 and, particularly, to elongate side members 12, 14.

A pair of hook members 48 are fastened, by fasteners 18, on a bottom side surface of apron 24. Hook members 48 are received within respective slots 49, located in the truck bed or dock 28, to thereby hold the ramp 10 in place.

A second end of ramp 10, denoted generally by reference numeral 40, has a transition plate 42, preferably formed of an aluminum alloy, for engaging with a flat surface (e.g., the ground) 44. Additionally, the combination of a grate 16', located at second end 40 of ramp 10, and transition plate 42 are adapted to receive hand grips 46 as illustrated and described in detail below.

Figure 3:
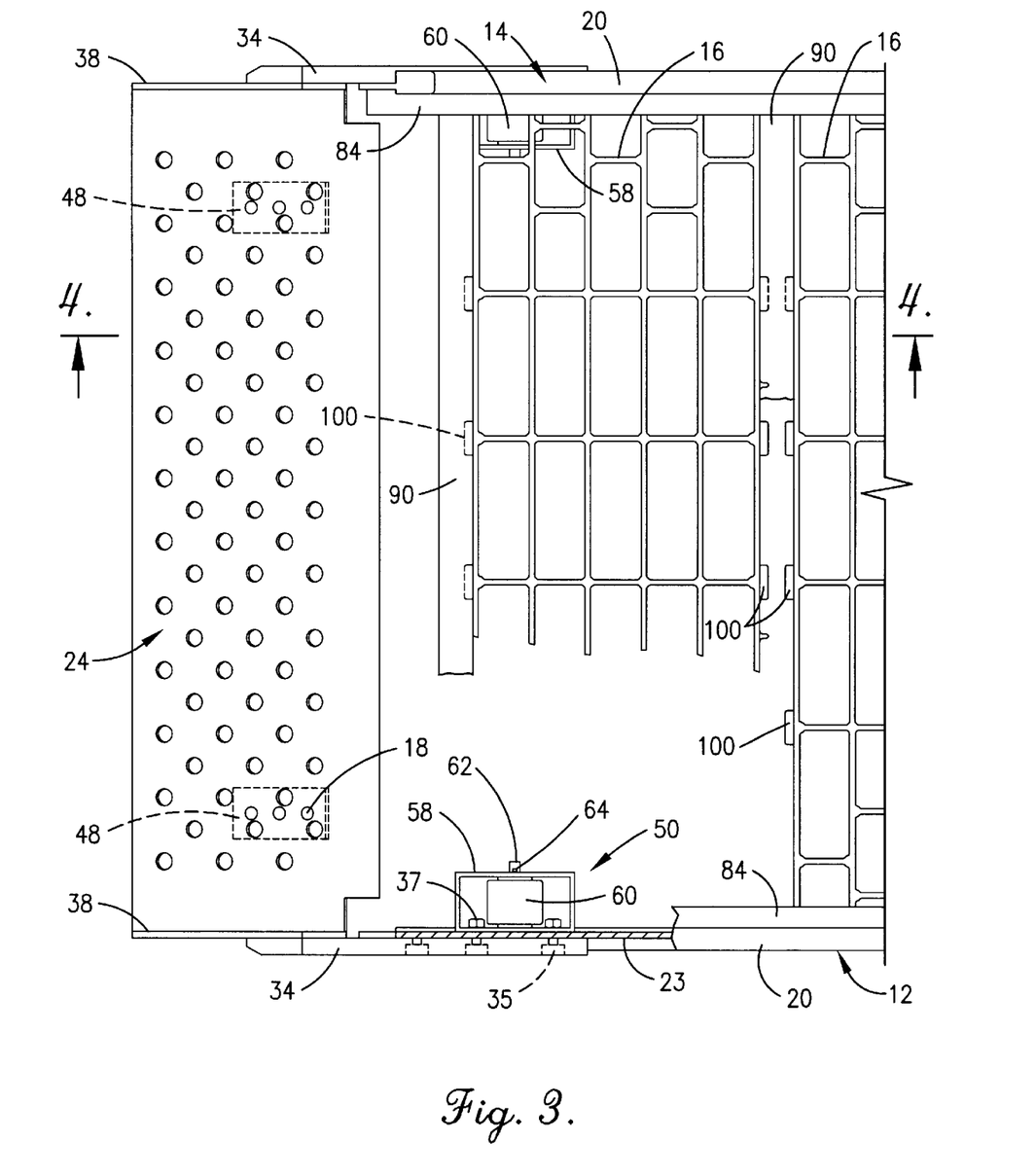
FIG. 3 is an enlarged, partial top plan view of a first end of the ramp of the present invention.
Figure 4:
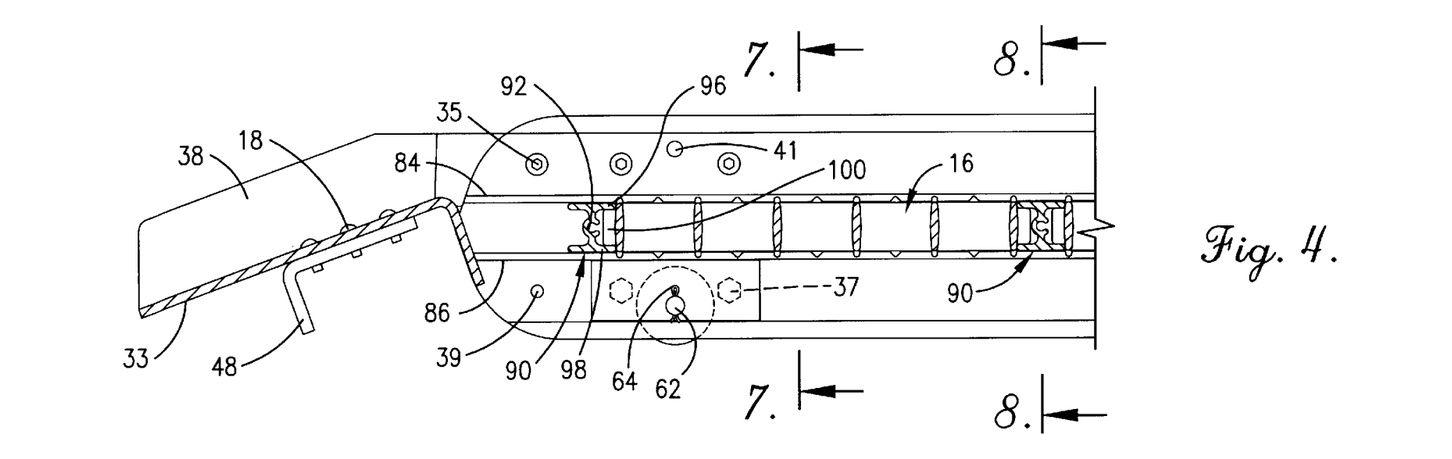
FIG. 4 is a cross-sectional view, taken along line 4—4 of FIG. 3.

With reference now to FIGS. 3 and 4, a first end 26 of ramp 10, including apron 24, mounting brackets 34, grates 16, and a bracket and wheel assembly 50 are shown and described in greater detail.

Each grate 16 is preferably formed by die-casting aluminum, or another metal or alloy. Each grate 16 is preferably formed in a grid, although it will be readily appreciated that other forms could be constructed by the die-casting process. Thus, each grate 16 may be referred to as a casting member. As shown, each casting member 16 has a plurality of blocks extending outwardly from each side edge thereof. With additional reference to FIG. 4, it is seen that tie rods 90 extend between side members 12, 14 and are positioned between grates 16 in the manner shown. Specifically, and with additional reference to FIGS. 7 and 8, taken along lines 7—7 and 8—8 of FIG. 4, respectively, each tie rod 90 is preferably formed generally in an I-beam construction, having a C-shaped channel 92 at a central portion thereof for receiving a self-tapping screw 94.

Each elongate side member 12, 14, and particularly side member 12 as illustrated in FIG. 8, has upper and lower portions 20, 22, respectively, and a primary portion 23. First and second flanges 84, 86 project from primary portion 23 along the length of side member 12. Flanges 84, 86 extend inwardly towards the interior of the ramp and, it will be understood that elongate side member 14, on the opposite side of ramp 10, has similar inwardly extending elongate flanges opposing flanges 84, 86 on elongate side member 12. As shown in FIG. 8, and with additional reference to FIG. 5, grates 16 are positioned between elongate flanges 84, 86 at each side of ramp 10.

As shown, flanges 84, 86 form a channel in which outer ends of each grate 16 are closely received. Similarly, outer ends of each tie rod 90 are closely received within the channel in each side member 12, 14 formed by flanges 84, 86. As shown best in FIG. 4, outwardly extending blocks 100 are snugly received by upper and lower portions 96, 98 of the corresponding tie rod 90. Thus, each grate 16 is retained at its outer ends within the channel formed by flanges 84, 86 of each side member 12, 14, and is also retained along side edges thereof by respective tie rods 90. As described, each tie rod 90 is secured to the side members 12, 14 by self-tapping screws, which serves to pull side members 12, 14 toward each other and into secure engagement with the outer ends of tie rods 90 and grate 16.

The utilization of tie rods 90 in the manner described is extremely useful for distributing loads applied to the walking surface of the ramp. In this regard, loads applied to a tie rod 90 are distributed throughout the tie rod and each adjacent grate 16. Thus, as the ramp is used, loads applied to the upper side surface of grate 16 are efficiently distributed throughout the components of the ramp 10, thereby resulting in an extremely strong ramp.

As shown in FIG. 4, the mounting of apron 24 as described is such that apron 24 is oriented angularly with respect to elongate ramp 10. In this way, when apron 24 is oriented horizontally to engage with a generally horizontal truck bed or dock surface, elongate ramp 10 will decline from a first end 26 thereof to a second end 40.

Mounting brackets 34 are fastened by bolts 35 to primary member 23 of side members 12, 14. Additionally, each mounting bracket 34 is attached to a wall portion 38 of apron 24.

First and second bracket and wheel assemblies 50 are located, at the first end 26 of ramp 10, at opposite sides of ramp 10 as shown in FIG. 3. Particularly, a first bracket and wheel assembly 50 is mounted to elongate side member 12, and a second bracket and wheel assembly 50 is mounted to elongate side member 14. Each bracket and wheel assembly 50 has a generally box-shaped bracket 58 having a wheel 60 rotatably mounted within bracket 58. For example, a bolt 62 is positioned through elongate side member 12, through box-shaped bracket 58 and a central portion of wheel 60, and held in place by a pin 64. Fasteners 37 mount the box-shaped bracket 58 to a respective elongate side portion 12, 14 of ramp 10. As shown in FIGS. 1 and 4, wheels 60 have a periphery extending slightly below ramp 10 to permit ramp 10 to be easily rolled when it is desired to move ramp 10.

In accordance with an important aspect of the present invention, a first series of apertures 39 is positioned at first end 26 of ramp 10, in a lower portion thereof, and a second series of apertures 39 is positioned at first end 26 of each elongate side member 12, 14 in an upper portion thereof. As shown in FIG. 4, bolts 35 securely retain apron 24 within the upper series of apertures, while the lower series of apertures 39 remain unused. However, when an upper surface of ramp 10 becomes worn or damaged, the apron 24 may be removed by removing bolts 35, the ramp 10 turned over so that its lower side surface becomes its upper side surface, and the apron 24 attached to first end 26 of the ramp at the other set of apertures 39. As shown, apertures 39 also receive fasteners 37 for detachably connecting bracket and wheel assembly 50 to its corresponding elongate side members 12, 14. Apertures 41 are provided for receiving bolt 62 threaded through wheel 60.

Figure 5:
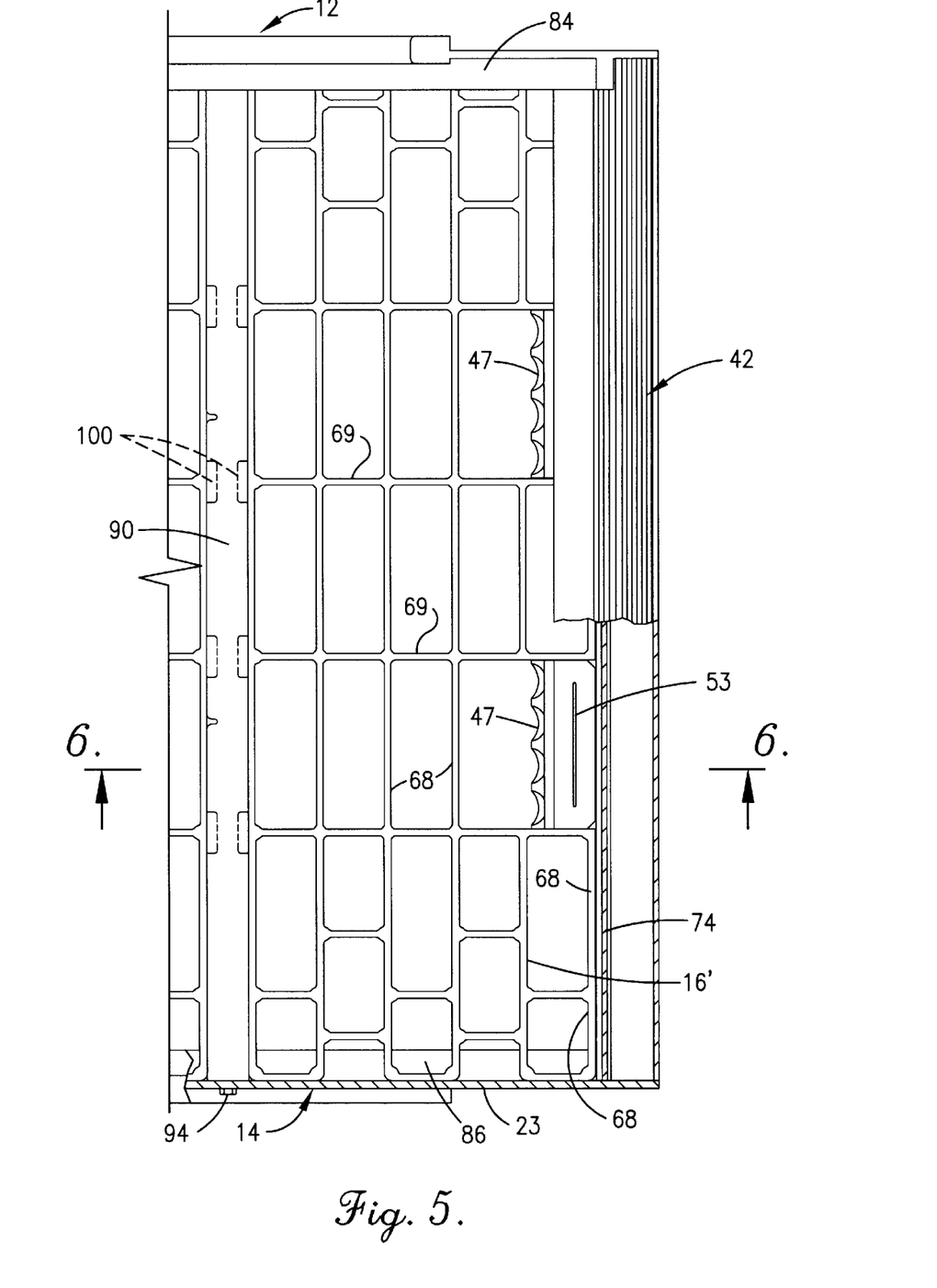
FIG. 5 is an enlarged, partial top plan view of a second end of the ramp of the present invention.
Figure 6:
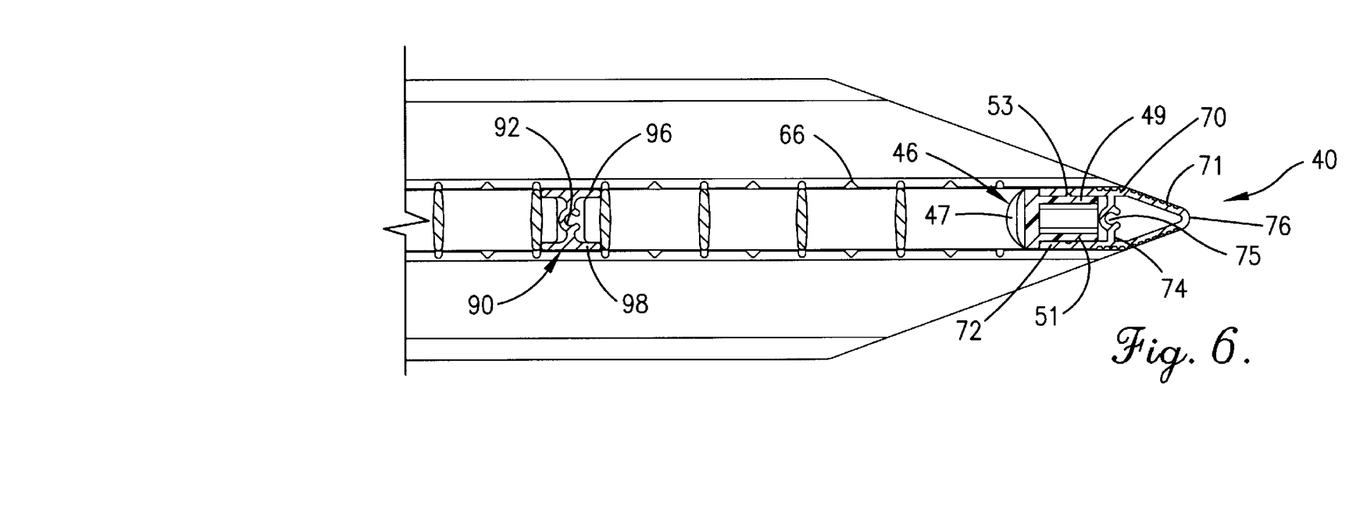
FIG. 6 is a cross-sectional fragmentary view taken along line 6—6 of FIG. 5.

With reference now to FIGS. 5 and 6, a second end of ramp 10, denoted generally by reference numeral 40, is illustrated and described.

As shown in FIG. 5, grate 16' has positioned about an outer edge thereof a transition plate 42. Additionally, grate 16' is slightly modified from the other grates so as to accommodate hand grips 46.

Transition plate 42 has ribs 71, for traction, extending outwardly from upper and lower surfaces 70, 72 respectively. Upper and lower surfaces 70, 72 cooperate with grates 16 to form the platform of ramp 10 corresponding to the side of the ramp 10 used as a walking surface. Upper and lower surfaces 70, 72 of transition plate 42 have an end wall 74 forming a channel 75 similar in construction to tie rods 90. An outer rear portion of channel 75 abuts up against an outer elongate portion 68 of grate 16', as shown in FIG. 5. Transition plate 42 tapers outwardly to the extreme second end 40 of ramp 10 to an apex 76, as shown. Transition plate 42 is fastened between elongate side members 12, 14 in the same manner as the tie rods 90 are fastened, namely, by self-tapping screws screwed through the side walls of side members 12, 14 and into the channel 75.

Figure 7:
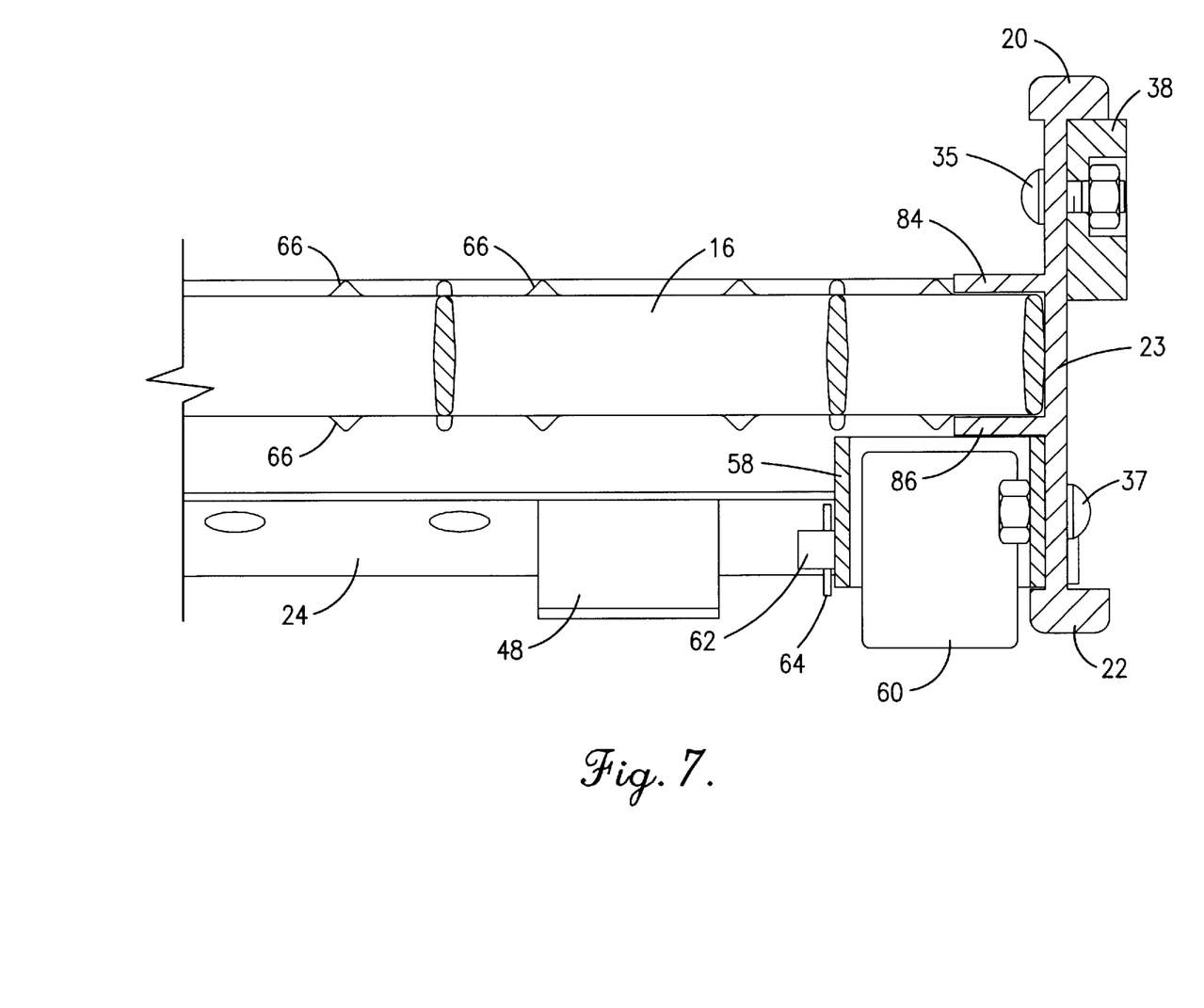
FIG. 7 is a fragmentary cross-sectional view taken along line 7—7 of FIG. 4.

As shown in FIGS. 5 and 7, hand grips 46 are positioned on grates 16'. Particularly, selected regions of an elongate portion 68 on grate 16' are removed to accommodate hand grips 46. Each hand grip 46 is fixedly located within the space formed between upper and lower surfaces 70, 72 of the transition plate 42. As shown, each hand grip 46 has an exposed gripping area 47 and upper and lower portions 49, 51, respectively, extending rearwardly from gripping area 47. Upper and lower portions 49, 51 of hand grips 46 are snugly received between upper and lower portions 70, 72 of transition plate 42. As shown, portions 49, 51 of hand grip 46 have a rib 53 extending outwardly therefrom, which rib 53 snap-fits into a channel located on a corresponding inner side surface 70, 72 of transition plate 42.

In accordance with an important aspect of the present invention, each grate 16 includes gripping nodules 66 on both its upper and lower surface. Particularly, in accordance with a key aspect of the present invention, each grate 16 has numerous such gripping nodules 66 extending outwardly therefrom such that, as an individual walks on any portion of ramp 10, numerous of the gripping nodules 66 engage with the sole of the shoe of the individual. As will be readily understood, each grate 16 is comprised of a number of elongate portions 68 having cross-portions 69 extending therebetween.

In use, ramp 10 of the present invention is positioned to provide a spanning surface between two other surfaces. For instance, as shown in FIG. 1, a first end 26 of ramp 10 may be positioned at a dock or truck bed, while a second end 40 of the ramp 10 is positioned on another surface, such as the ground 44. Grates 16 thus provide a load bearing platform having gripping nodules 66 on its surface. Particularly, apron 24 at first end 26 of ramp 10 is oriented to mate with the generally horizontal surface 28 of a truck bed or dock.

Ramp 10 is reversible such that, when desired or, particularly, when gripping nodules 66 on an upper surface of the platform formed by grates 16 become worn after extensive use, ramp 10 may be flipped over so that its lower surface becomes its upper surface, and vice versa. To reverse ramp 10, apron 24 is removed from ramp 10 by loosening or detaching bolts 35, removing each bracket and wheel assembly 50, turning apron 24 upside-down and re-positioning apron 24 in a position proximate the position at which bracket and wheel assemblies 50 were mounted. Additionally, each bracket and wheel assembly 50 is re-positioned onto side members 12, 14 in a position proximate the location at which apron 24 was mounted by brackets 34 to side members 12, 14. It will be understood that, in order for apron 24 to properly align with the generally horizontal surface 28 of a dock or truck bed, it is oriented in the opposite manner from its initial orientation on ramp 10. This is accomplished simply by turning the apron over and positioning the bracket 34 that was mounted to side member 12 onto side member 14 and, thus, positioning the bracket member 34 that was initially mounted to side member 14 onto side member 12.

In accordance with a preferred process of manufacturing the ramp 10 of the present invention, elongate side members 12, 14 are extruded of an extrudable material. Preferably, elongate side members 12, 14 are extruded from an aluminum or magnesium alloy. Grates 16 are formed by die-casting a material. Preferably, grates 16 are formed of a die-cast magnesium alloy. It has been found that die-casting grates 16 provides grates 16 in which gripping nodules 66 are easily fabricated on opposite side surfaces of grates 16. Grates 16 are then fastened between elongate extruded side members 12, 14.

Tie rods 90 and grates 16 are positioned between elongate side members 12, 14, such that outer ends thereof are received within the channel formed by flanges 84, 86 on side members 12, 14. Self-tapping screws are positioned through side members 12, 14 and into the C-shaped channel 92 in the tie rods 90. Apron 24 and transition plate 42 are then positioned and secured onto ramp 10. The ramp of the present invention provides a unique ramp which is highly useful as a walking surface between two other surfaces. Particularly, the unique use of a die-casting process for fabricating the casting members results in a unique casting member having gripping nodules on both side surfaces thereof. Additionally, the ramp is easily reversible when an upper surface thereof becomes worn or damaged, by simply removing the apron 24 from the series of apertures 39 in which it is placed, turning the ramp over so that its upper side surface becomes its lower side surface (and vice versa) and reattaching the apron 24 into the other series of apertures 39. Similarly, each bracket and wheel assembly 50 is removed from its position within an aperture 39 and secured within the opposite aperture 39.

From the foregoing it will be seen that this invention is one well adapted to attain all ends and objects hereinabove set forth together with the other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative, and not in a limiting sense.

What is claimed is:

1. A portable ramp comprising:
    a substantially flat platform, having first and second ends and upper and lower surfaces, said ramp for bearing a load;
    gripping nodules located on said upper and lower surfaces of said platform, wherein said ramp is reversible so that said upper and lower surfaces are adapted to change places with each other; and
    first and second elongate support members, wherein said platform is located therebetween.

2. The ramp as set forth in claim 1, wherein said platform further has a plurality of casting members fixedly located between said first and second elongate members.

3. The portable ramp as set forth in claim 2, wherein each said casting member has said upper and lower surface having said gripping nodules thereon.

4. The portable ramp as set forth in claim 2 further comprising a plurality of tie rods, each said tie rod positioned between and engaging with a pair of said casting members, each said tie rod having first and second outer ends joined to said first and second elongate support members, respectively, by a self-tapping fastener.

5. The portable ramp as set forth in claim 1 further comprising an apron located at said first end of said platform, said apron angularly oriented and releasibly mounted relative to said platform, wherein said angular orientation of said apron to said platform is fixed when said apron is attached to said platform.

6. The portable ramp as set forth in claim 5, said apron further comprising at least one hook positioned on a bottom side surface thereof.

7. The portable ramp as set forth in claim 6, further comprising a transition plate located at said second end of said platform.

8. The portable ramp as set forth in claim 7, further comprising hand grips located within said platform proximate said second end of said platform.

9. The portable ramp as set forth in claim 8 further comprising at least one wheel proximate said first end of said platform.

10. A portable ramp, having first and second ends, comprising:
    first and second elongate members extending between said first and second ends of said ramp;
    a plurality of grates, each said grate fixedly positioned between said elongate members and having gripping nodules on first and second side surfaces thereof;
    a reversible apron proximate said first end of said ramp, said apron angularly oriented relative to said surfaces of said grates, said apron detachably mounted relative to said first and second elongate members, wherein said apron is adapted for detachment from said elongate members and further adapted for reattachment to said elongate members when said combination of said elongate members and said grates is flipped over, to thereby reverse said ramp.

11. The portable ramp as set forth in claim 10 further comprising a transition plate, for engaging with a surface, proximate said second end of said ramp, said transition plate located between said elongate members.

12. The portable ramp as set forth in claim 10, wherein said grates are formed of die-cast material.

13. The portable ramp as set forth in claim 12, wherein said first and second elongate members are formed of extruded material.

14. A method for fabricating a portable ramp, said method comprising:
    extruding a material to form first and second elongate members;
    die-casting a material to form a plurality of grates; and
    fixedly locating said grates between said extruded elongate members, thereby providing a platform for bearing a load.

15. The method as set forth in claim 14, wherein said die-casting step includes forming a plurality of nodules on each side of each said grate.

16. The method as set forth in claim 15 wherein said step of extruding and step of die-casting further includes extruding and die-casting a material comprising magnesium.

17. A portable ramp comprising:
    first and second elongate side members;
    a plurality of casting members, each said casting member extending between said first and second side members;
    a plurality of tie rods, each said tie rod extending between said first and said second side member and positioned between and engaged with a corresponding pair of said casting members, wherein said tie rods are secured to said side members by self-tapping fasteners.

18. The portable ramp, as set forth in claim 17, wherein each said tie rod has a channel formed along each side thereof for receiving an outer side edge portion of said casting members with which it engages.

19. The portable ramp, as set forth in claim 18, wherein each of said first and second elongate side members has a channel, along an interior face thereof, for receiving an outer end portion of said casting members.

20. The portable ramp, as set forth in claim 19, wherein each said casting member has a plurality of gripping nodules located on an upper and a lower side surface thereof.

* * * * *